United States Patent
Yoshida et al.

(10) Patent No.: US 8,613,508 B2
(45) Date of Patent: Dec. 24, 2013

(54) AQUEOUS INK FOR INKJET RECORDING

(75) Inventors: Hiroyuki Yoshida, Wakayama (JP);
Takahiro Sato, Wakayama (JP);
Masayuki Narita, Wakayama (JP)

(73) Assignee: Kao Corporation, Tokyo (JP)

( * ) Notice: Subject to any disclaimer, the term of this patent is extended or adjusted under 35 U.S.C. 154(b) by 316 days.

(21) Appl. No.: 12/673,947

(22) PCT Filed: Aug. 20, 2008

(86) PCT No.: PCT/JP2008/064807
§ 371 (c)(1),
(2), (4) Date: Feb. 17, 2010

(87) PCT Pub. No.: WO2009/025287
PCT Pub. Date: Feb. 26, 2009

(65) Prior Publication Data
US 2011/0102529 A1 May 5, 2011

(30) Foreign Application Priority Data

Aug. 21, 2007 (JP) ................................ 2007-214347
Oct. 12, 2007 (JP) ................................ 2007-266161

(51) Int. Cl.
*B41J 2/01* (2006.01)

(52) U.S. Cl.
USPC .......................................... 347/100; 347/95

(58) Field of Classification Search
USPC ............. 347/100, 95, 96, 101, 102; 106/31.6, 106/31.13, 31.27; 523/160, 161
See application file for complete search history.

(56) References Cited

U.S. PATENT DOCUMENTS

| | | | |
|---|---|---|---|
| 6,251,553 B1 | 6/2001 | Baur et al. | |
| 2004/0059019 A1* | 3/2004 | Nakano et al. | 523/160 |
| 2005/0004262 A1* | 1/2005 | Azuma et al. | 523/160 |
| 2005/0215663 A1* | 9/2005 | Berge et al. | 523/160 |
| 2007/0078200 A1* | 4/2007 | Yoshida et al. | 523/160 |
| 2008/0028981 A1* | 2/2008 | Mizushima et al. | 106/31.13 |
| 2008/0064786 A1* | 3/2008 | Tanaka et al. | 523/201 |
| 2009/0246481 A1* | 10/2009 | Sano et al. | 347/100 |
| 2009/0297712 A1 | 12/2009 | Kasahara et al. | |

FOREIGN PATENT DOCUMENTS

| | | |
|---|---|---|
| JP | 10-219166 A | 8/1998 |
| JP | 11-049998 | 2/1999 |
| JP | 2004-217788 A | 8/2004 |
| JP | 2004-285215 A | 10/2004 |
| JP | 2005-41971 A | 2/2005 |
| JP | 2005-82751 A | 3/2005 |
| JP | 2005-120265 A | 5/2005 |
| JP | 2006-57044 A | 3/2006 |
| JP | 2007-197635 A | 8/2007 |
| JP | 2007-204698 A | 8/2007 |
| WO | WO 2006/064193 A1 | 6/2006 |

OTHER PUBLICATIONS

Japanese Office Action for Application No. 2007-214347 dated Jun. 5, 2012.
Japanese Office Action for Japanese Application No. 2007-266161 issued on Oct. 2, 2012 with an English language translation.

* cited by examiner

*Primary Examiner* — Manish S Shah
(74) *Attorney, Agent, or Firm* — Birch, Stewart, Kolasch & Birch, LLP

(57) ABSTRACT

The present invention relates to (1) a water-based ink for ink-jet printing having excellent storage stability and anti-curling property which includes particles of a crosslinked water-insoluble polymer containing a colorant wherein a content of water in the ink is 60% by weight or less, and the crosslinked polymer contains an anionic group neutralized with a base in an amount of from 0.5 mmol or more per 1 g of the crosslinked polymer; (2) a process for producing the water-based ink; and (3) a method of reducing curling of a print wherein the print is obtained by printing characters or images thereon with the water-based ink using an ink-jet printer.

21 Claims, No Drawings

AQUEOUS INK FOR INKJET RECORDING

FIELD OF THE INVENTION

The present invention relates to water-based inks for ink-jet printing, a process for producing the water-based inks, and a method of reducing curling of a print using the water-based inks.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using plain paper as the recording medium, non-contact with printed images and characters, etc.

Patent Document 1 discloses an ink for ink-jet printing which includes at least a coloring material, an organic solvent, water and a polymer compound wherein a content of water in the ink is from 10 to 50% by mass, a content of the water-soluble organic solvent having an SP value of from 9.0 to 12.0 in the ink is 30% by mass or more, and the polymer compound contains a plurality of side chains which are bonded to a hydrophilic main chain thereof and can be crosslinked to each other by irradiation with active energy rays. In Patent Document 1, it is described that the ink is excellent in ejection stability and anti-curling property.

Patent Document 2 discloses a process for producing an aqueous pigment dispersion by using a pigment and a resin containing a carboxyl group and a crosslinkable functional group in which the crosslinkable functional group of the resin is reacted with a crosslinking agent. In Patent Document 2, it is described that the resulting aqueous pigment dispersion exhibits a good storage stability and is capable of forming a coating film that is excellent in water resistance, durability, etc.

Patent Document 3 discloses an aqueous pigment dispersion including a carboxyl group-containing thermoplastic resin and a pigment dispersed in the thermoplastic resin wherein the carboxyl group-containing thermoplastic resin is crosslinked after dispersing the pigment therein. In Patent Document 3, it is described that the aqueous pigment dispersion is excellent in light fastness, water resistance, solvent resistance, stability with time, etc.

Patent Document 4 discloses an ink for jet printers which contains a quinacridone solid solution pigment which is constituted of two or more kinds of quinacridone-based compounds.

Patent Document 5 discloses a water-based ink for ink-jet printing which includes a water dispersion of particles of a water-insoluble vinyl polymer containing a solid solution magenta pigment wherein the water-insoluble vinyl polymer is obtained by copolymerizing at least (A) an alicyclic (meth) acrylate and (B) a salt-forming group-containing monomer.

Patent Document 6 discloses an aqueous pigment dispersion for ink-jet printing which is obtained by kneading a mixture of a quinacridone solid solution pigment, a salt-forming group-containing polymer, a neutralizing agent, an organic solvent and water and then adding water and/or an organic solvent to the resulting kneaded material to dilute and disperse the material therein.

However, the above conventional aqueous dispersions and water-based inks are still unsatisfactory in storage stability and anti-curling property.

Patent Document 1: JP 2007-91910A
Patent Document 2: JP 9-104834A
Patent Document 3: WO 99/52966A
Patent Document 4: JP 10-219166A
Patent Document 5: JP 2005-29597A
Patent Document 4: JP 2006-104367A

SUMMARY OF THE INVENTION

The present invention relates to a water-based ink for ink-jet printing which is excellent in storage stability and anti-curling property, a process for producing the water-based ink, and a method of reducing curling of a print using the water-based ink.

The present inventors have found that when adjusting a water content in the ink to a predetermined value or less and using particles of a crosslinked water-insoluble polymer whose anion content is controlled to a specific range, the resulting water-based ink for ink-jet printing is excellent in storage stability and anti-curling property.

That is, the present invention relates to the following aspects [1] to [3].

[1] A water-based ink for ink-jet printing including particles of a crosslinked water-insoluble polymer which contain a colorant, wherein a content of water in the ink is from 20 to 60% by weight, and the crosslinked polymer contains an anionic group neutralized with a base in an amount of from 0.5 to 5 mmol per 1 g of the crosslinked polymer.

[2] A process for producing the water-based ink for ink-jet printing as described in the above [1], including the following steps (1) to (4):

(1) dispersing a mixture of a water-insoluble polymer, an organic solvent, a colorant, a neutralizing agent and water to obtain a dispersion of colorant-containing water-insoluble polymer particles:

(2) removing the organic solvent from the dispersion obtained in the step (1) to obtain a water dispersion of the colorant-containing water-insoluble polymer particles;

(3) mixing the water dispersion of the colorant-containing water-insoluble polymer particles which is obtained in the step (2) with a crosslinking agent to crosslink the water-insoluble polymer with the crosslinking agent and thereby obtain a water dispersion of colorant-containing crosslinked water-insoluble polymer particles; and (4) mixing the water dispersion obtained in the step (3) with at least a hydrophilic organic solvent to obtain the water-based ink for ink-jet printing.

[3] A method of reducing curling of a print, wherein the print is obtained by printing characters or images thereon with the water-based ink as described in the above [1] using an ink-jet printer.

DETAILED DESCRIPTION OF THE INVENTION

The water-based ink for ink-jet printing according to the present invention contains particles of a crosslinked water-insoluble polymer which contain a colorant (hereinafter occasionally referred to merely as a "crosslinked polymer" or "crosslinked polymer particles"), and is characterized in that a content of water in the ink is from 20 to 60% by weight, and the crosslinked polymer contains an anionic group neutralized with a base in an amount of from 0.5 to 5 mmol per 1 g of the crosslinked polymer.

The respective components used in the water-based ink of the present invention are described below.

[Colorant]

The colorant used in the present invention is not particularly limited, and there may be used any of pigment, hydrophobic dye, and water-soluble dye (such as acid dye, reactive dye and direct dye). The colorant used in the present invention is preferably pigment or hydrophobic dye in view of a good water resistance, a good storage stability and a good rubbing resistance. Among these colorants, to meet the recent strong demand for a high weather resistance, preferred is the pigment.

The pigment and hydrophobic dye used in the water-based ink are required to be present in the form of stable fine particles using a surfactant or a polymer. In particular, in view of anti-bleeding property and water resistance, the pigment and/or hydrophobic dye is preferably included in the polymer particles.

The pigment may be either organic or inorganic. The organic or inorganic pigment may be used in combination with an extender pigment, if required.

Examples of the inorganic pigment include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the extender pigment include silica, calcium carbonate and talc.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and solid solution pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue and C.I. Pigment Green, etc., with various product numbers, as well as quinacridone solid solution pigments containing two or more kinds of quinacridone-based compounds.

The quinacridone pigment in the form of a solid solution containing two or more kinds of quinacridone-based compounds (hereinafter occasionally referred to merely as a "quinacridone solid solution pigment (A)") is such a pigment in which two or more kinds of quinacridone-based compounds are used to thereby exhibit excellent properties such as color tone, weather resistance and solvent resistance.

Examples of the quinacridone-based compounds include compounds represented by the following general formula:

$$X_n\text{-}Q\text{-}Y_m$$

wherein Q is a quinacridone residue or a quinacridone quinone residue; X and Y are respectively a hydrogen atom, a methyl group, a chloro group or a methoxy group; and n and m are respectively an integer of 1 to 4.

Specific examples of the quinacridone-based compounds include unsubstituted quinacridone, 2,9-dimethyl quinacridone, 2,9-dichloroquinacridone, 2,9-dimethoxy quinacridone, 3,10-dimethyl quinacridone, 3,10-dichloroquinacridone, 3,10-dimethoxy quinacridone, 4,11-dimethyl quinacridone, 4,11-dichloroquinacridone, 4,11-dimethoxy quinacridone and quinacridone quinone.

Examples of the suitable quinacridone solid solution pigment (A) include solid solution pigments containing two compounds selected from the group consisting of unsubstituted quinacridone, dimethyl-substituted quinacridone and dichloro-substituted quinacridone. More specifically, as the quinacridone solid solution pigment (A), there may be suitably used (1) solid solution pigments containing unsubstituted quinacridone in combination with dimethyl-substituted quinacridone such as 2,9-dimethyl quinacridone, (2) solid solution pigments containing unsubstituted quinacridone in combination with dichloro-substituted quinacridone such as 2,9-dichloroquinacridone and 3,10-dichloroquinacridone, and (3) solid solution pigments containing dimethyl-substituted quinacridone such as 2,9-dimethyl quinacridone in combination with dichloro-substituted quinacridone such as 2,9-dichloroquinacridone and 3,10-dichloroquinacridone.

Among these quinacridone solid solution pigments (A), preferred are (1) solid solution pigments containing unsubstituted quinacridone in combination with dimethyl-substituted quinacridone and (2) solid solution pigments containing unsubstituted quinacridone in combination with dichloro-substituted quinacridone. Still more specifically, from the viewpoint of a good color tone, among these quinacridone solid solution pigments (A), preferred are solid solutions containing unsubstituted quinacridone (such as C.I. Pigment Violet 19) in combination with 2,9-dimethyl quinacridone (such as C.I. Pigment Red 122) and solid solutions containing unsubstituted quinacridone (such as C.I. Pigment Violet 19) in combination with 2,9-dichloroquinacridone (such as C.I. Pigment Red 202), and more preferred are solid solutions containing unsubstituted quinacridone (such as C.I. Pigment Violet 19) in combination with 2,9-dichloroquinacridone (such as C.I. Pigment Red 202).

Meanwhile, the unsubstituted quinacridone may be either an α-type, a β-type or a γ-type. From the viewpoint of a good storage stability, among these unsubstituted quinacridones, preferred are unsubstituted quinacridones of a β-type or a γ-type. For example, as the quinacridone solid solution pigment (A), there m ay be used solid solution magenta pigments as described in JP 10-219166A.

In the quinacridone solid solution pigment (A), the weight ratio of unsubstituted quinacridone to dimethyl-substituted quinacridone [unsubstituted quinacridone/dimethyl-substituted quinacridone], the weight ratio of unsubstituted quinacridone to dichloro-substituted quinacridone [unsubstituted quinacridone/dichloro-substituted quinacridone] and the weight ratio of dimethyl-substituted quinacridone to dichloro-substituted quinacridone [dimethyl-substituted quinacridone/dichloro-substituted quinacridone] are respectively adjusted to preferably from 5/95 to 95/5 and more preferably from 10/90 to 90/10 from the viewpoints of a good ejection reliability, a good optical density and a good chroma of the resulting ink.

The quinacridone solid solution pigment (A) may be produced by known methods. For example, the quinacridone solid solution pigment (A) may be produced by (i) a method in which a crude unsubstituted quinacridone and a quinacridone-based compound are dissolved in an aprotic polar organic solvent in the presence of a caustic alkali, and the obtained solution is neutralized with an acid to re-precipitate the aimed pigment (refer to JP 60-35055A), (ii) a method in which crude or subpigmentary quinacridone compounds are milled in the presence of an alcohol and a base which are present in an amount capable of solubilizing the compounds, and the obtained solid solution is isolated (refer to JP 2-38463A), (iii) a method in which two or more 2,5-diarylaminoterephthalic acid derivatives are subjected to condensation cyclization reaction and then to pigmentation treatment (for controlling a shape, a size and a type of crystals) (JP 10-219166A), or the like.

The quinacridone solid solution pigment (A) may be in the form of either a powdery, granular or massive dried pigment, a wet cake or a slurry.

The quinacridone solid solution pigment (A) preferably has an average particle size of from 0.01 to 0.3 μm and more preferably from 0.03 to 0.2 μm from the viewpoint of a good storage stability. Meanwhile, the average particle size of the pigment may be determined as an average value of major axis diameters of 100 pigment particles as measured by an image analysis (x 20000) using a transmission electron microscope (TEM).

The hydrophobic dyes are not particularly limited as long as they are capable of being included in the crosslinked polymer particles. To allow the dye to efficiently become included in the polymer, the solubility of the hydrophobic dye is preferably 2 g/L or more and more preferably from 20 to 500 g/L as measured at 25° C. on the basis of the organic solvent used upon the production of the polymer (such as preferably methyl ethyl ketone).

Examples of the hydrophobic dyes include oil-soluble dyes and disperse dyes. Among these dyes, preferred are oil-soluble dyes.

Examples of the oil-soluble dyes include one or more dyes selected from the group consisting of commercially available products marketed from Orient Chemical Industries Co., Ltd., BASF AG, etc., under the tradenames C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers.

Examples of the disperse dyes include one or more dyes selected from the group consisting of commercially available products marketed under the tradenames C.I. Disperse Yellow, C.I. Disperse Orange, C.I. Disperse Red, C.I. Disperse Violet, C.I. Disperse Blue, C.I. Disperse Green, etc., with various product numbers. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

The above colorants may be used alone or in the form of a mixture containing any two or more thereof at an optional mixing ratio.

[Crosslinked Water-Insoluble Polymer]

The crosslinked water-insoluble polymer used in the present invention is preferably a crosslinked polymer obtained by crosslinking a water-insoluble polymer with a crosslinking agent. The "water-insoluble polymers" as used herein mean polymers exhibiting a solubility in water of 10 g or less, preferably 5 g or less and more preferably 1 g or less when the polymers are dried at 105° C. for 2 h, and then dissolved in 100 g of water at 25° C. In the case where the polymers have a salt-forming group, the solubility means a solubility of the polymers whose salt-forming groups are neutralized completely (i.e., 100%) with acetic acid or sodium hydroxide according to kinds of the salt-forming groups.

Examples of the water-insoluble polymers used in the present invention include polyesters, polyurethanes and vinyl-based polymers. Among these polymers, preferred are vinyl-based polymers obtained by addition-polymerizing vinyl monomers (such as vinyl compounds, vinylidene compounds and vinylene compounds) in view of a good storage stability thereof.

[Vinyl-Based Polymer (Hereinafter Occasionally Referred to Merely as a "Vinyl Polymer")]

The vinyl polymer used in the present invention is preferably a vinyl polymer which is produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)") (such a mixture is hereinafter occasionally referred to merely as a "monomer mixture"). The vinyl polymer contains a constitutional unit derived from the component (a), and a constitutional unit derived from the component (b) and/or a constitutional unit derived from the component (c). The vinyl polymer is more preferably a water-insoluble vinyl-based graft polymer containing the constitutional unit derived from the component (a) or the constitutional units derived from the components (a) and (c) as a main chain, and the constitutional unit derived from the component (b) as a side chain.

[(a) Salt-Forming Group-Containing Monomer]

The salt-forming group-containing monomer (a) is used for enhancing a storage stability of the resulting dispersion. Examples of the salt-forming group include a carboxyl group, a sulfonic group, a phosphoric group, an amino group and an ammonium group.

Examples of the salt-forming group-containing monomers include cationic monomers and anionic monomers as described in paragraph [0022] of JP 9-286939A, etc.

Typical examples of the cationic monomers include unsaturated amine-containing monomers and unsaturated ammonium salt-containing monomers. Among these cationic monomers, preferred are N,N-dimethylaminoethyl(meth)acrylate, N-(N',N'-dimethylaminopropyl) (meth)acrylamide and vinyl pyrrolidone.

Typical examples of the anionic monomers include unsaturated carboxylic acid monomers, unsaturated sulfonic acid monomers and unsaturated phosphoric acid monomers.

Specific examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Specific examples of the unsaturated sulfonic acid monomers include styrenesulfonic acid, 2-acrylamido-2-methylpropanesulfonic acid, 3-sulfopropyl(meth)acrylate and bis(3-sulfopropyl)itaconic ester. Specific examples of the unsaturated phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good storage stability and a good ejecting stability of the resulting inks, preferred are the unsaturated carboxylic acid monomers, and more preferred are acrylic acid and methacrylic acid.

[(b) Macromer]

The macromer (b) is used for enhancing a storage stability of the crosslinked polymer particles containing the colorant. The macromer (b) is preferably in the form of a monomer containing a polymerizable unsaturated group which has a number-average molecular weight of from 500 to 100,000 and preferably from 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good storage stability of the crosslinked polymer particles containing the colorant, etc., preferred is at least one macromer selected from the group consisting of styrene-based macromers, aromatic group-containing (meth)acrylate-based macromers and silicone-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there may be used homopolymers of an aromatic group-containing (meth)acrylate or copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, or an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl (meth)acrylate, phenoxyethyl(meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl(meth)acrylate.

The polymerizable functional group bonded to one terminal end of these macromers is preferably an acryloyloxy group or a methacryloyloxy group. Examples of the suitable other monomers copolymerizable with the aromatic group-containing (meth)acrylate include acrylonitrile.

The content of the constitutional unit derived from the styrene-based monomer in the styrene-based macromer or the content of the constitutional unit derived from the aromatic group-containing (meth)acrylate in the aromatic group-containing (meth)acrylate-based macromer is preferably 50% by weight or more and more preferably 70% by weight or more in view of enhancing an affinity of the polymer to pigments.

The macromer (b) may further contain side chains composed of other constitutional units derived from an organopolysiloxane, etc. Such a side chain may be produced, for example, by copolymerizing the macromer with a silicone-based macromer having a polymerizable functional group at one terminal end thereof which is represented by the following formula (1):

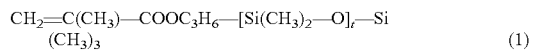

$$CH_2=C(CH_3)-COOC_3H_6-[Si(CH_3)_2-O]_t-Si(CH_3)_3 \quad (1)$$

wherein t is a number of from 8 to 40.

The styrene-based macromer as the component (b) is commercially available, for example, from Toagosei Co., Ltd., with product names of AS-6(S), AN-6(S), HS-6(S), etc.

[(c) Hydrophobic Monomer]

The hydrophobic monomer (c) is used for enhancing an optical density of the resulting ink. Examples of the hydrophobic monomer include alkyl(meth)acrylates and aromatic group-containing monomers.

The preferred alkyl(meth)acrylates are those containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl(meth)acrylate, (iso)amyl(meth)acrylate, cyclohexyl(meth)acrylate, 2-ethylhexyl(meth)acrylate, (iso)octyl(meth)acrylate, (iso)decyl (meth)acrylate, (iso)dodecyl(meth)acrylate and (iso)stearyl (meth)acrylate.

Meanwhile, the terms "(iso- or tertiary-)" and "(iso)" as used herein mean both the structure in which the groups expressed by "iso" and "tertiary" are present, and the structure in which these groups are not present (i.e., normal). and the "(meth)acrylate" means acrylate, methacrylate or both thereof.

The aromatic group-containing monomer may contain a substituent group having a hetero atom, and is preferably a vinyl monomer containing an aromatic group having 6 to 22 carbon atoms, preferably 6 to 18 carbon atoms and more preferably 6 to 12 carbon atoms. Examples of the aromatic group-containing monomer include the above styrene-based monomer (component c-1), and the above aromatic group-containing (meth)acrylate (component c-2). Examples of the substituent group having a hetero atom include those exemplified previously.

Among these components (c), in view of enhancing an optical density, preferred is the styrene-based monomer (component c-1). Among these styrene-based monomers, especially preferred are styrene and 2-methyl styrene. The content of the component (c-1) in the component (c) is preferably from 10 to 100% by weight and more preferably from 20 to 80% by weight in view of enhancing an optical density.

Also, examples of the preferred aromatic group-containing (meth)acrylate as the component (c-2) include benzyl (meth)acrylate and phenoxyethyl (meth)acrylate. The content of the component (c-2) in the component (c) is preferably from 10 to 100% by weight and more preferably from 20 to 80% by weight in view of enhancing an optical density and a storage stability. Further, the components (c-1) and (c-2) are preferably used in combination with each other.

[(d) Hydroxyl Group-Containing Monomer]

The monomer mixture may further contain (d) a hydroxyl group-containing monomer (hereinafter occasionally referred to merely as a "component (d)"). The hydroxyl group-containing monomer (d) is used to exhibit an excellent effect of enhancing a storage stability of the resulting ink.

Examples of the component (d) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the subsequent descriptions) (meth)acrylate, polypropylene glycol (n=2 to 30) (meth)acrylate, and poly(ethylene glycol (n=1 to 15)/propylene glycol (n=1 to 15) (meth)acrylate. Among these hydroxyl group-containing monomers, preferred are 2-hydroxyethyl(meth)acrylate, polyethylene glycol monomethacrylate and polypropylene glycol methacrylate.

[(e) Monomer Represented by the Formula (2)]

The monomer mixture may further contain (e) a monomer (hereinafter occasionally referred to merely as a "component (e)") represented by the following formula (2):

$$CH_2=C(R^1)COO(R^2O)_q R^3 \quad (2)$$

wherein $R^1$ is a hydrogen atom or a lower alkyl group having 1 to 5 carbon atoms; $R^2$ is a divalent hydrocarbon group having 1 to 30 carbon atoms which may contain a hetero atom; $R^3$ is a monovalent hydrocarbon group having 1 to 30 carbon atoms which may contain a hetero atom or a phenyl group which may contain an alkyl group having 1 to 9 carbon atoms; and q represents an average molar number of addition of $R^2O$ groups, and is a number of from 1 to 60 and preferably a number of from 1 to 30.

The component (e) is used to exhibit an excellent effect of enhancing an ejection property of the resultant ink.

Examples of the hetero atom which may be contained in the monomer of the formula (2) include a nitrogen atom, an oxygen atom, a halogen atom and a sulfur atom.

Examples of the suitable $R^1$ group include methyl, ethyl and (iso)propyl.

Examples of the suitable $R^2O$ group include an oxyethylene group, an oxytrimethylene group, an oxypropane-1,2-diyl group, an oxytetramethylene group, an oxyheptamethylene group, an oxyhexamethylene group, and an oxyalkanediyl (oxyalkylene) group having 2 to 7 carbon atoms which is constituted from combination of at least two of these groups.

Examples of the suitable $R^3$ group include an aliphatic alkyl group having 1 to 30 carbon atoms, preferably 1 to 20 carbon atoms and more preferably 1 to 8 carbon atoms, an aromatic ring-containing alkyl group having 7 to 30 carbon atoms, a hetero ring-containing alkyl group having 4 to 30 carbon atoms, and a phenyl group which may contain an alkyl group having 1 to 8 carbon atoms.

Specific examples of the component (e) include methoxy polyethylene glycol (q in the formula (2): 1 to 30; this definition is similarly applied to the below-mentioned compounds) (meth)acrylate, methoxy polytetramethylene glycol (q=1 to 30) (meth)acrylate, ethoxy polyethylene glycol (q=1 to 30) (meth)acrylate, octoxy polyethylene glycol (q=1 to 30) (meth)acrylate, polyethylene glycol (q=1 to 30) (meth)acrylate 2-ethylhexyl ether, (iso)propoxy polyethylene glycol (q=1 to 30) (meth)acrylate, butoxy polyethylene glycol (q=1 to 30) (meth)acrylate, methoxy polypropylene glycol (q=1 to 30) (meth)acrylate, and methoxy(ethylene glycol/propylene glycol copolymer) (q=1 to 30: among which the number of ethylene glycol constitutional units is 1 to 29) (meth)acrylate. Among these compounds, preferred are octoxy polyethylene glycol (q=1 to 30) (meth)acrylate and polyethylene glycol (q=1 to 30) (meth)acrylate 2-ethylhexyl ether.

Specific examples of the commercially available components (d) and (e) include polyfunctional acrylate monomers (NK esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

These components (a) to (e) are respectively used alone or in the form of a mixture of any two or more thereof.

Upon production of the vinyl polymer, the contents of the above components (a) to (e) in the monomer mixture (contents of non-neutralized components; this definition is similarly applied to the subsequent descriptions) or the contents of the constitutional units derived from the components (a) to (e) in the vinyl polymer are as follows.

The content of the component (a) is preferably from 3 to 40% by weight, more preferably from 4 to 30% by weight and still more preferably from 5 to 25% by weight in view of a good storage stability of the resulting dispersion.

The content of the component (b) is preferably from 1 to 25% by weight and more preferably from 5 to 20% by weight, in particular, in view of enhancing an interaction with the pigment.

The content of the component (c) is preferably from 5 to 98% by weight and more preferably from 10 to 60% by weight in view of enhancing an optical density.

The content of the component (d) is preferably from 5 to 40% by weight and more preferably from 7 to 20% by weight in view of a good storage stability of the resulting dispersion.

The content of the component (e) is preferably from 5 to 50% by weight and more preferably from 10 to 40% by weight in view of a good ejection property of the resultant ink.

The total content of the components (a) and (d) [component (a)+component (d)] in the monomer mixture is preferably from 6 to 60% by weight and more preferably from 10 to 50% by weight in view of a good storage stability of the resulting dispersion. The total content of the components (a) and (e) [component (a)+component (e)] in the monomer mixture is preferably from 6 to 75% by weight and more preferably from 13 to 50% by weight in view of a good storage stability of the resulting dispersion and a good ejection property of the resulting ink. The total content of the components (a), (d) and (e) [component (a)+component (d)+component (e)] in the monomer mixture is preferably from 6 to 60% by weight and more preferably from 7 to 50% by weight in view of a good storage stability of the resulting dispersion and a good ejection property of the resulting ink.

Also, the weight ratio of the component (a) to a sum of the components (b) and (c) [component (a)/(component (b) +component (c))] is preferably from 0.01 to 1, more preferably from 0.02 to 0.67 and still more preferably from 0.03 to 0.50 in view of a good dispersion stability of the resulting dispersion and a good optical density of the resulting ink.

[Production of Polymer]

The polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent although not limited thereto. The organic polar solvent miscible with water may be used in the form of a mixture with water. Examples of the organic polar solvents include aliphatic alcohols having 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide. The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used in the polymerization reaction, and therefore are not particularly limited. The polymerization is generally conducted at a temperature of preferably from 30 to 100° C. and more preferably from 50 to 80° C. The polymerization time is preferably from 1 to 20 h. Further, the polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the polymer used in the present invention is preferably from 5,000 to 500,000, more preferably from 10,000 to 400,000, still more preferably from 10,000 to 300,000 and further still more preferably from 20,000 to 300,000 in view of a good optical density of the resultant ink and a good storage stability of the colorant therein. Meanwhile, the weight-average molecular weight of the polymer was measured by the method as described in Examples below.

When the polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group contained in the polymer before being crosslinked is preferably from 10 to 90%, more preferably from 20 to 80% and still more preferably from 30 to 80% from the viewpoints of a good storage stability and a high crosslinking efficiency.

The degree of neutralization of the anionic salt-forming group is calculated according to the following formula:

[weight (g) of neutralizing agent/equivalent of neutralizing agent]/[acid value of polymer (KOH mg/g)×weight (g) of polymer/(56×1000)]×100.

The degree of neutralization of the cationic salt-forming group is calculated according to the following formula:

[weight (g) of neutralizing agent/equivalent of neutralizing agent]/[amine value of polymer (HCl mg/g)×weight (g) of polymer/(36.5×1000)]×100.

The acid value or amine value may be calculated from the respective constitutional units of the polymer, or may also be determined by the method of subjecting a solution prepared by dissolving the polymer in an appropriate solvent (such as methyl ethyl ketone) to titration.

[Crosslinking Agent]

The crosslinking agent used in the present invention is preferably selected from those compounds containing at least two reactive functional groups in a molecule thereof in order to adequately crosslink the polymer. The molecular weight of the crosslinking agent is preferably from 120 to 2000, more preferably from 150 to 1500 and still more preferably from 150 to 1000 in view of a facilitated reaction of the polymer and a good storage stability of the resulting crosslinked polymer particles containing colorant.

The number of the reactive functional groups contained in the crosslinking agent is preferably from 2 to 6 in view of well controlling a molecular weight of the resulting crosslinked polymer and enhancing a storage stability of the resulting ink.

As the reactive functional groups, one or more groups selected from the group consisting of a hydroxyl group, an epoxy group, an aldehyde group, an amino group, a carboxyl group, an oxazoline group and an isocyanate group are preferred.

In order to allow the polymer to efficiently undergo crosslinking reaction on its surface, the solubility of the crosslinking agent in 100 g of water at 25° C. is preferably 50 g or less, more preferably 40 g or less and still more preferably 30 g or less.

Specific examples of the crosslinking agent include the following compounds (a) to (g):

(a) Compounds containing two or more hydroxyl groups in a molecule thereof:

Example of the compounds containing two or more hydroxyl groups include polyhydric alcohols such as ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanol amine, tridiethanol amine, polypropylene glycol, polyvinyl alcohol, pentaerythritol, sorbitol, sorbitan, glucose, mannitol, mannitan, sucrose and glucose.

(b) Compounds containing two or more epoxy groups in a molecule thereof:

Examples of the compounds containing two or more epoxy groups include polyglycidyl ethers such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A type diglycidyl ether.

(c) Compounds containing two or more aldehyde Groups in a molecule thereof:

Examples of the compounds containing two or more aldehyde groups include polyaldehydes such as glutaraldehyde and glyoxal.

(d) Compounds containing two or more amino groups in a molecule thereof:

Examples of the compounds containing two or more amino groups include polyamines such as ethylenediamine and polyethyleneimine.

(e) Compounds containing two or more carboxyl groups in a molecule thereof:

Examples of the compounds containing two or more carboxyl groups include polycarboxylic acids such as oxalic acid, malonic acid, succinic acid, fumaric acid, maleic acid and adipic acid.

(f) Compounds containing two or more oxazoline groups in a molecule thereof:

Examples of the compounds containing two or more oxazoline groups include compounds containing an aliphatic or aromatic group to which two or more, preferably from 2 or 3 oxazoline groups are bonded. Specific examples of the compounds containing two or more oxazoline groups include bisoxazoline compounds such as 2,2'-bis(2-oxazoline), 1,3-phenylene-bisoxazoline and 1,3-benzobisoxazoline, and compounds containing an end oxazoline group obtained by reacting the bisoxazoline compound with a polybasic carboxylic acid.

(g) Compounds containing two or more isocyanate groups in a molecule thereof:

Examples of the compounds containing two or more isocyanate groups include organic polyisocyanates and isocyanate-terminated prepolymers.

Specific examples of the organic polyisocyanates include aliphatic diisocyanates such as hexamethylene diisocyanate and 2,2,4-trimethylhexamethylene diisocyanate; aromatic diisocyanates such as tolylene-2,4-diisocyanate and phenylene diisocyanate; alicyclic diisocyanates; aromatic triisocyanates; and modified products of these polyisocyanates such as urethane-modified products. The isocyanate-terminated prepolymers may be obtained by reacting the organic polyisocyanate or the modified product thereof with a low-molecular weight polyol, etc.

Among these crosslinking agents, preferred are the compounds (b) containing two or more epoxy groups in a molecule thereof, and more preferred are ethylene glycol diglycidyl ether and trimethylolpropane polyglycidyl ether.

The polymer used in the present invention has a reactive group (crosslinkable functional group) capable of reacting with the crosslinking agent. The preferred combinations of the polymer and the crosslinking agent are as follows.

When the reactive group of the polymer is an anionic group such as a carboxyl group, a sulfonic group, a sulfuric group, a phosphonic group and a phosphoric group, the polymer is preferably used in combination with the crosslinking agent selected from the above compounds (a), (b), (d), (f) and (g). When the reactive group of the polymer is an amino group, the polymer is preferably used in combination with the crosslinking agent selected from the above compounds (b), (c), (e) and (g). When the reactive group of the polymer is a hydroxyl group, the polymer is preferably used in combination with the crosslinking agent selected from the above compounds (c), (e) and (g). When the reactive group of the polymer is an isocyanate group or an epoxy group, the polymer is preferably used in combination with the crosslinking agent selected from the above compounds (a), (d) and (e).

Among the above combinations, in view of well controlling the crosslinking reaction of the polymer such that the resulting crosslinked polymer has an adequate crosslinking structure, preferred is the combination of the polymer and the crosslinking agent containing a functional group capable of reacting with the anionic group of the polymer, and more preferred is the combination of the polymer and the compound (b) containing two or more epoxy groups in a molecule thereof.

The polymer containing an anionic group such as a carboxyl group, a sulfonic group and a phosphoric group, an amino group, a hydroxyl group, an isocyanate group, an epoxy group, etc., as the reactive group (crosslinkable functional group) capable of reacting with the above crosslinking agent may be produced by copolymerizing a polymerizable monomer composition containing a monomer having the above reactive group in the above procedure for producing the polymer.

As the polymer containing a salt-forming group such as an anionic group and an amino group as the reactive group capable of reacting with the crosslinking agent, there may be used those polymers obtained by copolymerizing the above salt-forming group-containing monomer. Also, as the polymer containing a hydroxyl group as the reactive group capable of reacting with the crosslinking agent, there may be used those polymers obtained by copolymerizing the above hydroxyl group-containing monomer.

As the polymer containing an epoxy group as the reactive group capable of reacting with the crosslinking agent, there may be used those polymers obtained by copolymerizing an epoxy group-containing monomer, more specifically, glycidyl (meth)acrylate. Further, as the polymer containing an isocyanate group as the reactive group capable of reacting with the crosslinking agent, there may be used (i) those polymers obtained by copolymerizing an isocyanate group-containing monomer, for example, isocyanato-ethyl (meth)acrylate, and (ii) those polymers obtained by copolymerizing an isocyanate-terminated prepolymer produced from an unsaturated polyester polyol and an isocyanate.

[Particles of Crosslinked Water-Insoluble Polymer Containing a Colorant]

In the present invention, the particles of the crosslinked water-insoluble polymer containing a colorant (hereinafter occasionally referred to as "colorant-containing crosslinked polymer particles" or merely as "crosslinked polymer particles") are used for suppressing curling of a print and enhancing a storage stability of the resulting ink.

The colorant-containing crosslinked polymer particles used in the present invention are characterized by containing an anionic group neutralized with a base in an amount of from 0.5 to 5 mmol per 1 g of the crosslinked polymer.

Specific examples of the anionic group neutralized with a base include a carboxylate ($-COOM^1$), a sulfonate ($-SO_3M^1$) and a phosphate ($-PO_3M^1_2$).

In the chemical formulae of the respective anionic groups, M1 may be the same or different. Examples of M1 include alkali metals such as lithium, sodium and potassium; an ammonium group; a monomethyl ammonium group, a dimethyl ammonium group and a trimethyl ammonium group; a monoethyl ammonium group; and other organic ammonium groups such as a trimethanol ammonium group.

Examples of the base include alkali metal hydroxides such as sodium hydroxide; alkali earth metal hydroxides; amines; organic amines such as triethanolamine; and basic amino acids.

The anionic group neutralized with the base undergoes dissociation so that charge repulsion between the dissociated anions occurs, which is considered to contribute to improvement in stability of the colorant-containing crosslinked polymer particles.

From the viewpoint of enhancing a stability of the colorant-containing crosslinked polymer particles owing to the charge repulsion therebetween, the amount of the anionic group neutralized with the base is 0.5 mmol/g or more, preferably 0.7 mmol or more, and more preferably 1.0 mmol or more per 1 g of the crosslinked polymer. The upper limit of the amount of the anionic group neutralized with the base is 5 mmol or less, preferably 3 mmol or less, more preferably 2 mmol or less and still more preferably 1.5 mmol or less per 1 g of the crosslinked polymer. From these viewpoints, the amount of the anionic group neutralized with the base is from 0.5 to 5 mmol, preferably from 0.5 to 3 mmol, more preferably from 0.7 to 2 mmol, still more preferably from 0.7 to 1.5 mmol and further still more preferably from 1.0 to 1.5 mmol per 1 g of the crosslinked polymer. When the amount of the anionic group neutralized with the base in the crosslinked polymer lies within the above-specified range, even the water-based ink having a high pigment concentration and a less water content can exhibit a high storage stability.

[Process for Producing Colorant-Containing Crosslinked Polymer Particles]

The colorant-containing crosslinked polymer particles is preferably produced by a process including a step I of obtaining colorant-containing polymer particles from a colorant and a polymer, and a step II of mixing the colorant-containing polymer particles obtained in the step I with a crosslinking agent to crosslink the polymer with the crosslinking agent and thereby produce crosslinked polymer particles, from the viewpoint of a good storage stability.

The production process including the steps I and II may be performed, for example, by the following steps (1) to (3):

(1) dispersing a mixture of a water-insoluble polymer, an organic solvent, a colorant, a neutralizing agent and water to obtain a dispersion of colorant-containing water-insoluble polymer particles;

(2) removing the organic solvent from the dispersion obtained in the step (1) to obtain a water dispersion of the colorant-containing water-insoluble polymer particles; and (3) mixing the water dispersion of the colorant-containing water-insoluble polymer particles which is obtained in the above step (2) with a crosslinking agent to crosslink the water-insoluble polymer with the crosslinking agent and thereby obtain a water dispersion containing colorant-containing crosslinked water-insoluble polymer particles.

In the step (1), there is preferably the method in which the polymer is first dissolved in the organic solvent, and then the colorant and water are added, if required, together with optional components such as a neutralizing agent and a surfactant, to the thus obtained organic solvent solution under mixing to obtain a dispersion of an oil-in-water type. The content of the colorant in the mixture is preferably from 5 to 50% by weight and more preferably from 10 to 40% by weight. The content of the organic solvent in the mixture is preferably from 10 to 70% by weight and more preferably from 10 to 50% by weight. The content of the polymer in the mixture is preferably from 2 to 40% by weight and more preferably from 3 to 20% by weight, and the content of water in the mixture is preferably from 10 to 70% by weight and more preferably from 20 to 70% by weight.

The weight ratio of the colorant to a sum of the polymer and the colorant [colorant/(polymer+colorant)] is preferably from 55/100 to 90/100 and more preferably from 70/100 to 85/100 from the viewpoint of a good storage stability of the resulting dispersion.

When the polymer contains a salt-forming group, the neutralizing agent is preferably used to neutralize the salt-forming group. The degree of neutralization of the salt-forming group in the polymer with the neutralizing agent is not particularly limited. In general, the degree of neutralization is preferably controlled such that the finally obtained water dispersion exhibits a neutral liquid property, for example, a pH of 4.5 to 10. The pH of the dispersion may also be determined from the desired degree of neutralization of the polymer. The neutralizing agent used in the present invention are those exemplified above. In addition, the polymer may be previously neutralized.

Examples of the organic solvents include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of the organic solvent in 100 g of water as measured at 20° C. is preferably 5 g or more, and more preferably 10 g or more. More specifically the solubility of the organic solvent is preferably from 5 to 80 g and more preferably from 10 to 50 g. Among these organic solvents, preferred are methyl ethyl ketone and methyl isobutyl ketone.

The method for dispersing the mixture in the step (1) is not particularly limited. The polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the obtained polymer particles to a desired value. The dispersion procedure in the step (1) is preferably conducted at a temperature of from 5 to 50° C. and more preferably from 10 to 35° C. The dispersing time is preferably from 1 to 30 h and more preferably from 2 to 25 h.

When subjecting the mixture to the preliminary dispersion procedure, there may be used ordinary mixing or stirring devices such as anchor blades. Examples of the preferred mixing or stirring devices include high-speed stirring mixers such as "Ultra Disper" (tradename: available from Asada Iron Works Co., Ltd.), "Ebara Milder" (tradename: available from Ebara Corporation), and "TK Homomixer" (tradename: available from Primix Corporation).

As a means for applying a shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.) and "Nanomizer" (tradename: available from Nanomizer Co., Ltd.). These apparatuses may be used in combination of any two or more thereof. Among these apparatuses, the high-pressure homogenizers are preferred in view of reducing a particle size of the pigment.

In the step (2), the organic solvent is removed from the thus obtained dispersion by known methods to render the dispersion aqueous, thereby obtaining a water dispersion of the colorant-containing polymer particles. The organic solvent is preferably substantially completely removed from the thus obtained water dispersion of the polymer particles. However, the residual organic solvent may be present in the water dispersion unless the objects and effects of the present invention are adversely affected by the residual organic solvent. If required, the residual organic solvent may also be removed again from the water dispersion after subjected to the crosslinking reaction. The content of the residual organic solvent in the resulting water dispersion is preferably 0.1% by weight or less and more preferably 0.01% by weight or less.

In the thus-obtained water dispersion of the colorant-containing polymer particles, solid components of the colorant-containing polymer are dispersed in water as a main solvent. The configuration of the polymer particles is not particularly limited as long as the particles are formed from at least the colorant and the polymer. Examples of the configuration of the polymer particles include the particle configuration in which the colorant is enclosed in the polymer, the particle configuration in which the colorant is uniformly dispersed in the polymer, and the particle configuration in which the colorant is exposed onto a surface of the respective polymer particles.

In the step (3), from the viewpoints of a high chroma and a good storage stability, there is preferably used the method of mixing the colorant-containing polymer particles with the crosslinking agent to crosslink the polymer with the crosslinking agent and thereby produce the colorant-containing crosslinked polymer particles, more specifically, the method of mixing the water dispersion of the colorant-containing polymer particles with the crosslinking agent to crosslink the polymer with the crosslinking agent and thereby produce a water dispersion of the colorant-containing crosslinked polymer particles. From the viewpoints of a high crosslinking efficiency and a good surface-crosslinked condition, it is preferred that the polymer be water-insoluble, and the solubility of the crosslinking agent in water fall within the above-specified range.

In the step (3), the catalyst, solvent, temperature and time used in the crosslinking reaction may be appropriately selected and determined according to the crosslinking agent used therein. The crosslinking reaction time is preferably from 0.5 to 10 h and more preferably from 1 to 5 h. The crosslinking reaction temperature is preferably from 40 to 95° C.

The amount of the crosslinking agent (compound containing two or more reactive functional groups in a molecule thereof) used in the crosslinking reaction is adjusted such that the weight ratio of the crosslinking agent to the polymer [crosslinking agent/polymer] is preferably from 0.3/100 to 50/100, more preferably from 0.3/100 to 35/100, still more preferably from 2/100 to 30/100, further still more preferably from 5/100 to 25/100 and further still more preferably from 5/100 to 20/100, from the viewpoint of a good storage stability.

In view of enhancing a stability of the crosslinked polymer particles, it is preferred that the crosslinking agent contain a functional group capable of reacting with the anionic group of the polymer, and be used in an amount capable of reacting with preferably from 0.1 to 3 mmol, more preferably from 0.2 to 2.5 mmol and still more preferably from 0.4 to 2.5 mmol, further still more preferably from 0.7 to 2.5 mmol, further still more preferably from 0.7 to 2.0 mmol and most preferably from 0.7 to 1.5 mmol of the anionic group in the polymer in terms of the anionic group per 1 g of the polymer.

Also, the step of crosslinking the polymer may be performed by mixing the dispersion of the colorant-containing polymer particles obtained in the step (1) with the crosslinking agent. In this case, the dispersion of the crosslinked polymer particles obtained in the crosslinking step may be subjected to removal of the organic solvent therefrom in the same manner as in the above step (2), thereby enabling production of the water dispersion of the colorant-containing crosslinked polymer particles.

The crosslinking rate (mol %) of the crosslinked polymer as determined from the following formula (3) is preferably from 10 to 80 mol %, more preferably from 20 to 80 mol % and still more preferably from 30 to 60 mol % from the viewpoint of a good storage stability. The crosslinking rate is the value calculated from the amount of the crosslinking agent used and the number of moles of the reactive group thereof as well as the amount of the polymer used and the number of moles of the reactive group thereof capable of reacting with the reactive group of the crosslinking agent.

Crosslinking Rate (mol %)=[(number of moles of reactive group of crosslinking agent)×100/(number of moles of reactive group of polymer capable of reacting with reactive group of crosslinking agent)] (3)

In the above formula (3), the "number of moles of reactive group of crosslinking agent" is the value obtained by dividing a weight of the crosslinking agent used by an equivalent amount of the reactive group thereof, that is, the value obtained by multiplying the number of moles of the crosslinking agent used by the number of the reactive groups in a molecule of the crosslinking agent.

The weight ratio of the colorant to a sum of the crosslinked polymer and the colorant [colorant/(crosslinked polymer+colorant)] is preferably from 55/100 to 90/100 and more preferably from 70/100 to 85/100 from the viewpoint of a good storage stability.

[Process for Producing Water-Based Ink Containing Colorant-Containing Crosslinked Polymer Particles]

The water-based ink for ink-jet printing according to the present invention is produced by the process including, in addition to the above steps (1) to (3), the following step (4).

Step (4): Mixing the water dispersion obtained in the step (3) with at least a hydrophilic organic solvent to obtain the water-based ink for ink-jet printing.

The hydrophilic organic solvent as used herein means an organic solvent having a solubility in 100 g of water of 50 g or more as measured at 25° C. The solubility in 100 g of water of the hydrophilic organic solvent is preferably 60 g or more, and the saturated vapor pressure thereof (as measured at 20° C.) is preferably from 0.001 to 1 kPa. The hydrophilic organic solvent is capable of functioning as a component for suppressing breakage of a hydrogen bond in a recording paper owing to action of water.

As the hydrophilic organic solvent, there may be used monoalkyl ethers of one or more alkylene glycols selected from the group consisting of monoalkylene glycols, dialkylene glycols and trialkylene glycols.

The alkylene group contained in the alkylene glycols is preferably an alkylene group having 2 to 4 carbon atoms, such as an ethylene group, a propylene group and a butylene group, and the alkylene groups contained in a molecule of the di- or trialkylene glycols may be the same or different. Examples of the preferred alkyl group contained in the monoalkyl ether include an alkyl group having 1 to 4 carbon atoms, more specifically, a methyl group, an ethyl group, an n-propyl group, an isopropyl group, an n-butyl group, an isobutyl group and a t-butyl group.

Among these alkylene glycol monoalkyl ethers, especially preferred are ethylene glycol mono-n-butyl ether, diethylene glycol mono-n-butyl ether, triethylene glycol mono-n-butyl ether, tetraethylene glycol mono-n-butyl ether and dipropylene glycol monobutyl ether.

The above hydrophilic organic solvents may be used alone or in the form of a mixture of any two or more thereof.

In the water-based ink for ink-jet printing according to the present invention, various additives ordinarily used in water-based inks for ink-jet printing such as wetting agents, penetrants, dispersants, viscosity modifiers, defoaming agents, mildew-proof agents and anti-corrosion agents may be further added to the water-based ink containing the colorant-containing crosslinked polymer particles which is obtained through the above steps (1) to (4).

The content of the colorant in the water-based ink is preferably from 3 to 30% by weight, more preferably from 4 to 30% by weight, still more preferably from 6 to 25% by weight, further still more preferably from 8 to 20% by weight and further still more preferably from 10 to 15% by weight from the viewpoints of a high optical density and a good storage stability. Meanwhile, the content of the colorant in the water dispersion before preparing the water-based ink is preferably from 10 to 50% by weight and more preferably from 15 to 40% by weight from the viewpoints of a high optical density and a good storage stability. By using the colorant-containing crosslinked polymer particles obtained in the present invention, the resulting ink can exhibit an excellent storage stability even when the water content therein is 60% by weight or less and the ink contains the colorant at a high concentration.

The content of the colorant-containing crosslinked polymer particles in the water-based ink is preferably from 5 to 50% by weight and more preferably from 10 to 40% by weight in view of suppressing curling of a print and enhancing a storage stability of the ink.

The average particle size of the colorant-containing crosslinked polymer particles is preferably from 10 to 500 nm, more preferably from 30 to 300 nm and still more preferably from 50 to 200 gm in view of preventing clogging of nozzles in a printer and enhancing a storage stability of the resulting ink. Meanwhile, the average particle size may be measured by the method described in the below-mentioned Examples.

The content of water in the water-based ink is from 20 to 60% by weight, preferably from 30 to 60% by weight, more preferably from 30 to 57% by weight and still more preferably from 30 to 55% by weight from the viewpoint of suppressing curling of a print.

The content of the hydrophilic organic solvent in the water-based ink is preferably 10% by weight or more, more preferably from 10 to 35% by weight and still more preferably from 15 to 35% by weight in view of suppressing curling of a print and maintaining a good storage stability of the ink while inhibiting increase in viscosity thereof.

The surface tension of the water-based ink of the present invention (as measured at 20° C.) is preferably from 25 to 50 mN/m and more preferably from 27 to 45 mN/m. The viscosity of the water-based ink having a solid content of 10% by weight (as measured at 20° C.) is preferably from 2 to 12 mPa·s and more preferably from 2.5 to 10 mPa·s in order to keep a good ejection property of the ink. The pH value of the water-based ink is preferably from 4 to 10.

(Method for Reducing Curling of Print)

In the method for reducing curling of a print according to the present invention, the print is obtained by printing characters or images thereon with the water-based ink containing the colorant-containing crosslinked polymer particles using an ink-jet printer. As a result, the obtained print can be prevented from curling and has an excellent optical density.

The color to be printed with the ink may include not only monochromatic color such as cyan, magenta and yellow but also multi-chromatic colors such as dichromatic and trichromatic colors of blue, red and green.

A recording medium to be printed with the water-based ink is not particularly limited. In the present invention, as the recording medium, there may be used either a plain paper or a coated paper which are generally available in the market. However, from the viewpoint of more effectively exhibiting the effects of the present invention, a plain paper is preferably used.

The ink-jet printer to which the water-based ink of the present invention is applicable is not particularly limited. However, the water-based ink of the present invention is more suitably applied to a piezoelectric-type ink-jet printer. Also, the water-based ink of the present invention can be suitably applied to a high-speed printer, for example, those capable of printing at a print speed of from 3 to 150 sheets/min, preferably from 5 to 100 sheets/min and more preferably from 10 to 100 sheets/min.

EXAMPLES

In the following production examples, examples and comparative examples, the "part(s)" and "%" indicate "part(s) by weight" and "% by weight", respectively, unless otherwise specified. Meanwhile, the weight-average molecular weight, average particle size and viscosity were respectively measured by the following methods.

(1) Weight-Average Molecular Weight of Polymer

The weight-average molecular weight of the polymer was measured by gel chromatographic method [GPC apparatus: "HLC-8120GPC" available from Tosoh Corp.; column: "TSK-GEL α-M"×2 available from Tosoh Corp.; Flow speed: 1 mL/min)] using N,N-dimethyl formamide containing 60 mmol/L of phosphoric acid and 50 mmol/L of lithium bromide as a solvent and using a polystyrene as a standard substance.

(2) Measurement of Average Particle Size of Colorant-Containing Crosslinked Polymer Particles The average particle size of the particles was measured by using a laser particle analyzing system "ELS-8000" (cumulant analysis) available from Otsuka Electronics Co., Ltd. The measurement was conducted at a temperature of 25° C., an angle between incident light and detector of 90° and a cumulative frequency of 100 times, and a refractive index of water (1.333) was input to the analyzing system as a refractive index of the dispersing medium. Further, the measurement was conducted by adjusting a concentration of the dispersion to be measured to about 5×10-3% by weight.

(3) Measurement of Viscosity

The measurement of the viscosity was carried out at 20° C. and a rotating speed of 100 rpm for 1 min using a E-type viscometer "RE80" available from Toki Sangyo Co., Ltd., and a standard rotor (1°34'×R24).

Production Examples 1 to 4

Twenty parts of MEK (methyl ethyl ketone) and 0.03 part of a chain transfer agent (2-mercaptoethanol) as well as 10% of 200 parts of a mixture of respective monomers shown in Table 1 were charged into a reaction vessel and mixed with each other, and then the reaction vessel was fully purged with a nitrogen gas to thereby obtain a mixed solution.

Separately, remaining 90% of the monomer mixture shown in Table 1 was charged into a dropping funnel, and further 0.27 part of the chain transfer agent, 60 parts of MEK and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. while stirring in a nitrogen atmosphere, and then the mixed solution in the dropping funnel was gradually dropped thereinto over 3 h. After the elapse of 2 h from completion of the dropping while maintaining the resulting mixed solution at a temperature of 65° C., a solution prepared by dissolving 0.3 part by weight of the radical polymerization initiator in 5 parts of MEK was added to the mixed solution, and the resulting reaction solution was further aged at 65° C. for 2 h and then at 70° C. for 2 h to obtain a solution of a vinyl-based polymer (P-1 to P-4). The weight-average molecular weight and acid value of the thus obtained polymer are shown in Table 1. Meanwhile, the acid value (KOHmg/g) of the polymer is calculated from the proportion and molecular weight of methacrylic acid in the polymer.

Meanwhile, details of the respective monomers shown in Table 1 are as follows.

Styrene Macromer: "AS-6S" (tradename) available from Toagosei Co., Ltd.; number-average molecular weight: 6000; polymerizable functional group: methacryloyloxy group Polyethylene glycol monomethacrylate (average molar number of addition of ethyleneoxide: 9; "NK-ESTER M-90G" (tradename) available from Shin-Nakamura Kagaku Kogyo Co., Ltd.

Polypropylene glycol monomethacrylate (average molar number of addition of propylenewdde: 9; "BLEMMER PP-500" (tradename) available from NOF Corporation.

TABLE 1

| | Production Examples | | | |
|---|---|---|---|---|
| | 1 | 2 | 3 | 4 |
| Kind of Monomer (in terms of weight parts of solid content) | | | | |
| (a) Methacrylic acid | 17 | 22 | 23 | 11 |
| (b) Styrene macromer | 10 | 10 | 10 | 10 |
| (c) Benzyl methacrylate | 33 | 29 | 0 | 39 |
| (c) Styrene monomer | 10 | 10 | 37 | 10 |
| (d) Polyethylene glycol monomethacrylate | 15 | 15 | 15 | 15 |
| (d) Polypropylene glycol monomethacrylate | 15 | 15 | 15 | 15 |
| Kind of polymer produced | P-1 | P-2 | P-3 | P-4 |
| Weight-average molecular weight of polymer produced | 200,000 | 70,000 | 107,000 | 200,000 |
| Acid value of polymer produced (KOH mg/g) | 111 | 137 | 150 | 72 |

Example 1

Twenty five parts of the polymer produced by drying the solution of the polymer (P-1) obtained in Production Example 1 under reduced pressure were mixed with 78.6 parts of MEK. Then, 100 parts of a quinacridone pigment (C.I. Pigment Violet 19 "Hostaperm Red E5B02" (tradename) available from Clariant Japan K.K.) were added into the mixture of the polymer and MEK, and then the resulting mixture was intimately mixed. Further, 7.0 parts of a 5N sodium hydroxide aqueous solution and 6.0 parts of a 25% ammonia aqueous solution (neutralization degree: 60%) were added to the mixture, and the obtained mixture was stirred at 20° C. for 60 min using a disper ("Ultra Disper": available from Asada Iron Works Co., Ltd.) while rotating a disper blade at 7000 rpm. The resulting mixture was diluted with ion-exchanged water to prepare a 20% aqueous dispersion. The thus prepared dispersion was further dispersed under a pressure of 200 MPa by passing through a dispersing apparatus "MICROFLUIDIZER" (tradename) available from Microfluidics Corp., 10 times.

The resulting dispersion was mixed with 250 parts of ion-exchanged water and then stirred. Thereafter, MEK was completely removed from the dispersion under reduced pressure at 60° C., followed by removing a part of water therefrom. The obtained dispersion was filtered through a 5 μm-mesh filter (acetyl cellulose membrane; outer diameter: 2.5 cm; available from Fujifilm Corp.) fitted to a 25 mL syringe without a needle (available from Terumo Corp.) to remove coarse particles therefrom, thereby obtaining a water dispersion of pigment-containing vinyl-based polymer particles having a solid content of 20%.

Next, 0.177 part of a crosslinking agent ("DENACOL EX-321" (tradename) available from Nagase ChemteX Corp.; epoxy equivalent: 140; solubility in 100 g of water: about 27 g (at 25° C.)) was added to 40 g of the thus obtained water dispersion to adjust a crosslinking rate thereof to 40%, and the resultant mixture was stirred at 90° C. for 1 h. After completion of the stirring, the obtained reaction mixture was cooled and then filtered through a 5.0 gm-mesh filter (acetyl cellulose membrane; outer diameter: 2.5 cm; available from Fujifilm Corp.), thereby obtaining a water dispersion of pigment-containing crosslinked polymer particles.

The thus obtained water dispersion of pigment-containing crosslinked polymer particles in an amount of 62.5 parts was mixed with 10 parts of water, 26.2 parts of triethylene glycol monobutyl ether, 1 part of "SURFYNOL 465" available from Nissin Chemical Industry Co., Ltd., and 0.3 part of "Ploxel XL2" available from Avecia K.K. to adjust a water content thereof to 60%.

The thus obtained mixed liquid was filtered through a 5.0 μm-mesh filter (acetyl cellulose membrane; outer diameter: 2.5 cm; available from Fujifilm Corp.) fitted to a 25 mL syringe without a needle to remove coarse particles therefrom, thereby obtaining a water-based ink.

(Calculation of Crosslinking Rate of Crosslinked Polymer Particles)

The crosslinking rate (mol %) of the crosslinked polymer particles was calculated according to the above formula (3) (the crosslinking rate was similarly calculated in the subsequent Examples, etc.).

In Example 1, 1.6 parts of the water-insoluble polymer were reacted with 0.177 part of the crosslinking agent ("DENACOL EX-321"; epoxy equivalent: 140). Therefore, the number of moles of reactive groups in the crosslinking agent is determined as being $0.177/140=0.00126$.

Here, since the crosslinking agent ("DENACOL EX-321") is reacted with a carboxyl group, the number of moles of reactive groups in the polymer which are capable of reacting with the crosslinking agent is equal to the number of moles of methacrylic acid (molecular weight: 86) contained in the polymer, i.e., $1.6 \times 0.17/86=0.0032$.

Accordingly, the crosslinking rate of the water-insoluble crosslinked polymer particles is calculated as being $0.00126 \times 100/0.0032=40$ (mol %).

The amount (mmol/g) of the anionic group neutralized with a base per 1 g of the crosslinked polymer is calculated from an acid value of the polymer of 111 and a neutralization degree of the polymer of 60% as follows.

$$111/56 \times 0.6 \times (1.6/1.777)=1.07 \text{ mmol/g}$$

The amount of the crosslinking agent used is an amount capable of reacting with $0.00126/1.6 \times 1000 = 0.79$ mmol in terms of the anionic group per 1 g of the polymer.

Example 2

The water dispersion of pigment-containing crosslinked polymer particles (having a solid content of 20%) was produced in the same manner as in Example 1 except for using a dimethyl quinacridone pigment (C.I. Pigment Red 122; "CHROMOFINE RED 6111T" (tradename) available from Dainichiseika Color & Chemicals Mfg. Co., Ltd.) in place of the quinacridone pigment used in Example 1, using the polymer (P-2) obtained in Production Example 2 in place of the polymer (P-1), and adjusting the neutralization degree to 51% and the crosslinking rate to 49 mol %.

The thus obtained water dispersion of pigment-containing crosslinked polymer particles (having a solid content of 20%) in an amount of 62.5 parts was mixed with 36.2 parts of triethylene glycol monobutyl ether, 1 part of "SURFYNOL 465" available from Nissin Chemical Industry Co., Ltd., and 0.3 part of "Ploxel XL2" available from Avecia K.K. to adjust a water content thereof to 50%.

(Calculation of Crosslinking Rate of Crosslinked Polymer Particles)

In Example 2, 1.6 parts of the water-insoluble polymer were reacted with 0.266 part of the crosslinking agent ("DENACOL EX-321"; epoxy equivalent: 140). Therefore, the number of moles of reactive groups in the crosslinking agent is determined as being $0.266/140=0.0019$.

The number of moles of reactive groups in the polymer which are capable of reacting with the crosslinking agent is equal to the number of moles of methacrylic acid (molecular weight: 86) contained in the polymer, i.e., 1.6×0.21/86=0.0039.

Accordingly, the crosslinking rate of the water-insoluble crosslinked polymer particles is calculated as being 0.0019× 100/0.0039=49 (mol %).

The amount (mmol/g) of the anionic group neutralized with a base per 1 g of the crosslinked polymer is calculated from an acid value of the polymer of 137 and a neutralization degree of the polymer of 51% as follows.

137/56×0.51×(1.6/1.866)=1.07 mmol/g

The amount of the crosslinking agent used is an amount capable of reacting with 0.0019/1.6×1000=1.2 mmol in terms of the anionic group per 1 g of the polymer.

Example 3

The water dispersion of pigment-containing crosslinked polymer particles (having a solid content of 20%) was produced in the same manner as in Example 1 except for using a cyan pigment (C.I. Pigment Blue 15:3; "CHROMOFINE BLUE 6335JC" (tradename) available from Dainichiseika Color & Chemicals Mfg. Co., Ltd.) in place of the quinacridone pigment used in Example 1.

The thus obtained water dispersion of pigment-containing crosslinked polymer particles (having a solid content of 20%) in an amount of 62.5 parts was mixed with 36.2 parts of triethylene glycol monobutyl ether, 1 part of "SURFYNOL 465" available from Nissin Chemical Industry Co., Ltd., and 0.3 part of "Ploxel XL2" available from Avecia K.K. to adjust a water content thereof to 50%.

Example 4

The water dispersion of pigment-containing crosslinked polymer particles (having a solid content of 20%) was produced in the same manner as in Example 1 except for using a cyan pigment (C.I. Pigment Blue 15:3; "CHROMOFINE BLUE 6335JC" (tradename) available from Dainichiseika Color & Chemicals Mfg. Co., Ltd.) in place of the quinacridone pigment used in Example 1, using the polymer (P-3) obtained in Production Example 3 in place of the polymer (P-1), and adjusting the neutralization degree to 49% and the crosslinking rate to 51 mol %. The thus obtained water dispersion of pigment-containing crosslinked polymer particles (having a solid content of 20%) in an amount of 62.5 parts was mixed with 36.2 parts of triethylene glycol monobutyl ether, 1 part of "SURFYNOL 465" available from Nissin Chemical Industry Co., Ltd., and 0.3 part of "Ploxel XL2" available from Avecia K.K. to adjust a water content thereof to 50%.
(Calculation of Crosslinking Rate of Crosslinked Polymer Particles)

In Example 4, 1.6 parts of the water-insoluble polymer were reacted with 0.308 part of the crosslinking agent ("DE-NACOL EX-321"; epoxy equivalent: 140). Therefore, the number of moles of reactive groups in the crosslinking agent is determined as being 0.308/140=0.0022.

The number of moles of reactive groups in the polymer which are capable of reacting with the crosslinking agent is equal to the number of moles of methacrylic acid (molecular weight: 86) contained in the polymer, i.e., 1.6×0.23/86=0.0043.

Accordingly, the crosslinking rate of the water-insoluble crosslinked polymer particles is calculated as being 0.0022× 100/0.0043=51 (mol %).

The amount (mmol/g) of the anionic group neutralized with a base per 1 g of the crosslinked polymer is calculated from an acid value of the polymer of 150 and a neutralization degree of the polymer of 49% as follows.

150/56×0.49×(1.6/1.908)=1.10 mmol/g

The amount of the crosslinking agent used is an amount capable of reacting with 0.0022/1.6×1000=1.38 mmol in terms of the anionic group per 1 g of the polymer.

Example 5

The same procedure as in Example 3 was repeated except that the amount of triethylene glycol monobutyl ether was reduced so as to adjust a water content in ink to 60%, thereby obtaining a water-based ink.

Example 6

The same procedure as in Example 1 was repeated except for using a yellow pigment (C.I. Pigment Yellow 74; "FAST YELLOW 615" (tradename) available from Dainichiseika Color & Chemicals Mfg. Co., Ltd.) in place of the quinacridone pigment used in Example 1, using the polymer (P-2) obtained in Production Example 2 in place of the polymer (P-1), subjecting 1500 g of the dispersion obtained after stirring the mixture with the disper to dispersing treatment using a beads mill (beads: zirconia; beads filling rate: 85%; beads weight: 1560 g; flow rate: 200 g/min; peripheral speed: 20 m/s; rotating speed: 3,525 revolutions/min; treating time: 45 min) as well as to 10-pass dispersing treatment using a "MICROFLUIDIZER" (available from Microfluidics Corp.) under a pressure of 200 MPa upon preparation of the dispersion, changing the amount of the crosslinking agent used upon preparation of the water dispersion of the crosslinked polymer particles to 0.218 part, and adjusting the water content in ink to 50%, thereby obtaining a water-based ink.
(Calculation of Crosslinking Rate of Crosslinked Polymer Particles)

In Example 6, 1.6 parts of the water-insoluble polymer were reacted with 0.218 part of the crosslinking agent ("DE-NACOL EX-321"; epoxy equivalent: 140). Therefore, the number of moles of reactive groups in the crosslinking agent is determined as being 0.218/140=0.00156.

The number of moles of reactive groups in the polymer which are capable of reacting with the crosslinking agent is equal to the number of moles of methacrylic acid (molecular weight: 86) contained in the polymer, i.e., 1.6×0.21/86=0.0039.

Accordingly, the crosslinking rate of the water-insoluble crosslinked polymer particles is calculated as being 0.00156× 100/0.0039=40 (mol %).

The amount (mmol/g) of the anionic group neutralized with a base per 1 g of the crosslinked polymer is calculated from an acid value of the polymer of 137 and a neutralization degree of the polymer of 60% as follows.

137/56×0.6×(1.6/1.818)=1.29 mmol/g

The amount of the crosslinking agent used is an amount capable of reacting with 0.00156/1.6×1000=0.98 mmol in terms of the anionic group per 1 g of the polymer.

Example 7

The same procedure as in Example 5 was repeated except for using a cyan pigment (C.I. Pigment Blue 15:4; "CHROMOFINE BLUE 6337JC" (tradename) available from Dainichiseika Color & Chemicals Mfg. Co., Ltd.) in place of the cyan pigment used in Example 5, thereby obtaining a water-based ink.

Examples 8 and 9

The same procedure as in Example 1 was repeated except for changing a water content in ink as shown in Table 1, thereby obtaining water-based inks.

Example 10

The water dispersion of solid solution pigment-containing crosslinked polymer particles (having a solid content of 20%) was produced in the same manner as in Example 1 except for using a quinacridone solid solution pigment containing C.I. Pigment Violet 19 and C.I. Pigment Red 202 (weight ratio of C.I. Pigment Violet 19/C.I. Pigment Red 202: 20/80) in place of the quinacridone pigment used in Example 1.

Using the thus obtained solid solution pigment-containing vinyl polymer particles, the water-based ink was produced in the same manner as in Example 1.

Example 11

The same procedure as in Example 1 was repeated except for using a quinacridone solid solution pigment containing C.I. Pigment Violet 19 and C.I. Pigment Red 122 (weight ratio of C.I. Pigment Violet 19/C.I. Pigment Red 122: 90/10) in place of the quinacridone pigment used in Example 1, thereby obtaining a water-based ink.

Comparative Example 1

The water dispersion of pigment-containing vinyl-based polymer particles having a solid content of 20% was produced in the same manner as in Example 7 except that the polymer was not crosslinked. The thus obtained water dispersion of pigment-containing vinyl-based polymer particles in an amount of 62.5 parts was mixed with 15 parts of water, 7 parts of triethylene glycol monobutyl ether, 14.2 parts of glycerol, 1 part of "SURFYNOL 465" available from Nissin Chemical Industry Co., Ltd., and 0.3 part of "Ploxel XL2" available from Avecia K.K. to adjust a water content thereof to 65%.

The thus obtained mixed liquid was filtered through a 5.0 μm-mesh filter (acetyl cellulose membrane; outer diameter: 2.5 cm; available from Fujifilm Corp.) fitted to a 25 mL syringe without a needle to remove coarse particles therefrom, thereby obtaining a water-based ink.

Comparative Example 2

The same procedure as in Comparative Example 1 was repeated except for using the polymer (P-4) produced in Production Example 4 in place of the polymer (P-1), using a yellow pigment (C.I. Pigment Yellow 74; "FAST YELLOW 615" (tradename) available from Dainichiseika Color & Chemicals Mfg. Co., Ltd.) in place of the cyan pigment, and subjecting the dispersion obtained after stirring the mixture with the disper to dispersing treatments using a beads mill and a "Microfluidizer", respectively, in the same manner as in Example 6 upon preparation of the dispersion, thereby obtaining a water-based ink.

Comparative Example 3

The same procedure as in Comparative Example 1 was repeated except for using the polymer (P-4) produced in Production Example 4 in place of the polymer (P-1), and using a dimethyl quinacridone pigment (C.I. Pigment Red 122; "CHROMOFINE RED 6111T" (tradename) available from Dainichiseika Color & Chemicals Mfg. Co., Ltd.) in place of the cyan pigment, thereby obtaining a water-based ink.

Comparative Example 4

The same procedure as in Example 2 was repeated except for using no crosslinking agent, thereby obtaining a water-based ink.

Comparative Example 5

The water dispersion of pigment-containing vinyl-based polymer particles having a solid content of 20% was produced in the same manner as in Example 2 except that the polymer was not crosslinked. The thus obtained water dispersion of pigment-containing vinyl-based polymer particles in an amount of 31.3 parts was mixed with 40 parts of water, 7 parts of triethylene glycol monobutyl ether, 20.4 parts of glycerol, 1 part of "SURFYNOL 465" available from Nissin Chemical Industry Co., Ltd., and 0.3 part of "Ploxel XL2" available from Avecia K.K. to adjust a water content thereof to 65%.

The thus obtained mixed liquid was filtered through a 5.0 μm-mesh filter (acetyl cellulose membrane; outer diameter: 2.5 cm; available from Fujifilm Corp.) fitted to a 25 mL syringe without a needle to remove coarse particles therefrom, thereby obtaining a water-based ink.

Comparative Example 6

The water dispersion of pigment-containing vinyl-based polymer particles having a solid content of 20% was produced in the same manner as in Example 2 except that the polymer was not crosslinked. The thus obtained water dispersion of pigment-containing vinyl-based polymer particles in an amount of 31.3 parts was mixed with 25 parts of water, 36.2 parts of triethylene glycol monobutyl ether, 6.2 parts of glycerol, 1 part of "SURFYNOL 465" available from Nissin Chemical Industry Co., Ltd., and 0.3 part of "Ploxel XL2" available from Avecia K.K. to adjust a water content thereof to 50%.

The thus obtained mixed liquid was filtered through a 5.0 μm-mesh filter (acetyl cellulose membrane; outer diameter: 2.5 cm; available from Fujifilm Corp.) fitted to a 25 mL syringe without a needle to remove coarse particles therefrom, thereby obtaining a water-based ink.

Comparative Example 7

The water dispersion of pigment-containing vinyl-based polymer particles having a solid content of 20% was produced in the same manner as in Example 2 except that the neutralization degree of the polymer was adjusted to 20%, and the polymer was not crosslinked. The thus obtained water dispersion of pigment-containing vinyl-based polymer particles in an amount of 31.3 parts was mixed with 40 parts of water, 7 parts of triethylene glycol monobutyl ether, 20.4 parts of glycerol, 1 part of "SURFYNOL 465" available from Nissin Chemical Industry Co., Ltd., and 0.3 part of "Ploxel XL2" available from Avecia K.K. to adjust a water content thereof to 65%.

The thus obtained mixed liquid was filtered through a 5.0 μm-mesh filter (acetyl cellulose membrane; outer diameter: 2.5 cm; available from Fujifilm Corp.) fitted to a 25 mL syringe without a needle to remove coarse particles therefrom, thereby obtaining a water-based ink.

Comparative Examples 8 to 16

The same procedure as in Example 1 was repeated except for changing the conditions for production of ink as shown in Table 1, thereby obtaining water-based inks.

Next, the inks obtained in the respective Examples and Comparative Examples were evaluated for storage stability and anti-curling property by the following methods. The results are shown in Tables 2 and 3. In addition, the inks having the same water content which were produced using the crosslinked water-insoluble polymer and the non-crosslinked water-insoluble polymer, respectively, were compared to each other. The comparison results are shown in Table 4.

(1) Storage Stability

The respective inks obtained in the above Examples and Comparative Examples were allowed to stand in a hermetically sealed condition at 70° C. for one week. Thereafter, the rates of change in average particle size of the pigment-containing crosslinked polymer particles or pigment-containing polymer particles as well as viscosity of the inks were respectively measured by the above-mentioned methods, and evaluated according to the following ratings.

○: The rates of change in average particle size and viscosity were within the range of ±10%.

Δ: The rates of change in average particle size and viscosity exceeded ±10% and were within the range of ±15%.

X: The rates of change in average particle size and viscosity exceeded ±15% and were within the range of ±20%.

XX: The rates of change in average particle size and viscosity exceeded ±20%.

(2) Evaluation for Anti-Curling Property

Solid image printing with the respective water-based inks obtained in the above Examples and Comparative Examples was carried out on a commercially available wood-free plain paper ("XEROX P" (tradename) available from Xerox Corp.) using an ink-jet printer "Model EM-930C" (piezoelectric type) available from Seiko Epson Corp., such that the printed paper had a margin of 1.5 cm on each of top, bottom, right and left sides thereof. The printing conditions were as follows:

Kind of Paper: Plain paper; and
Mode set: Fine.

After allowing the printed paper to stand at 23° C. and 50% RH for one week, the heights (cm) of lifting at four corners of the paper were measured to calculate an average value of the measured heights.

(3) Evaluation for Optical Density

Solid image printing with the respective water-based inks obtained in the above Examples and Comparative Examples was carried out on a commercially available wood-free plain paper ("XEROX P" (tradename) available from Xerox Corp.) using an ink-jet printer "Model EM-930C" available from Seiko Epson Corp., under the following printing conditions:

Kind of Paper: Plain paper; and
Mode set: Fine.

After allowing the printed paper to stand at 25° C. for 24 h, the optical density values of the resulting print (5.1 cm×8.0 cm) were measured at total 5 points including a central portion and four corners of the paper using a Macbeth densitometer (product number "SPECTROEYE" available from Gretag Macbeth Corp.) to calculate an average value thereof.

TABLE 2-1

| | Examples | | | | | |
|---|---|---|---|---|---|---|
| | 1 | 2 | 3 | 4 | 5 | 6 |
| Contents in ink (wt %) | | | | | | |
| Pigment | 10 | 10 | 10 | 10 | 10 | 10 |
| Water | 60 | 50 | 50 | 50 | 60 | 50 |
| Hydrophilic organic solvent*1 | 26.2 | 36.2 | 36.2 | 36.2 | 26.2 | 36.2 |
| Pigment | | | | | | |
| C.I. No. | PV19 | PR122 | P15:3 | P15:3 | P15:3 | PY74 |
| Polymer | | | | | | |
| Kind | P-1 | P-2 | P-1 | P-3 | P-1 | P-2 |
| Neutralization degree (%) | 60 | 51 | 60 | 49 | 60 | 60 |
| Amount (part(s)) | 1.6 | 1.6 | 1.6 | 1.6 | 1.6 | 1.6 |
| Crosslinking agent | | | | | | |
| Kind*2 | EX-321 | EX-321 | EX-321 | EX-321 | EX-321 | EX-321 |
| Amount (part(s)) | 0.177 | 0.266 | 0.177 | 0.308 | 0.177 | 0.218 |
| Crosslinking rate of crosslinked polymer (mol %) | 40 | 49 | 40 | 51 | 40 | 40 |
| Anionic group (mmol/g)*3 | 1.07 | 1.07 | 1.07 | 1.07 | 1.07 | 1.29 |
| Amount of crosslinking agent used (mmol/g)*4 | 0.79 | 1.2 | 0.79 | 1.38 | 0.79 | 0.98 |
| Average particle size (nm)*5 | 100 | 120 | 105 | 80 | 105 | 100 |
| Evaluation results | | | | | | |
| Storage stability | ○ | ○ | ○ | ○ | ○ | ○ |
| Curling (cm) | 2.1 | 1.1 | 1.2 | 1.1 | 1.7 | 1.1 |
| Optical density | 1.00 | 1.00 | 1.10 | 1.17 | 1.10 | 1.03 |

Note
*1 Hydrophilic organic solvent: triethylene glycol monobutyl ether
*2 Crosslinking agent: "DENACOL EX-321" (epoxy equivalent: 140)
*3 Amount of anionic group neutralized with base per 1 g of crosslinked polymer (in Comparative Examples, the amount is per 1 g of polymer)
*4 Amount of crosslinking agent used per 1 g of polymer (in terms of anionic group in polymer)
*5 Average particle size of pigment-containing crosslinked polymer particles

TABLE 2-2

| | Examples | | | | |
|---|---|---|---|---|---|
| | 7 | 8 | 9 | 10 | 11 |
| Contents in ink (wt %) | | | | | |
| Pigment | 10 | 10 | 10 | 10 | 10 |
| Water | 60 | 50 | 55 | 60 | 50 |
| Hydrophilic organic solvent*1 | 26.2 | 26.2 | 26.2 | 26.2 | 26.2 |
| Pigment | | | | | |
| C.I. No. | P15:4 | PV19 | PV19 | PR19/PR202 | PR19/PR122 |
| Polymer | | | | | |
| Kind | P-1 | P-1 | P-1 | P-1 | P-1 |
| Neutralization degree (%) | 60 | 60 | 60 | 60 | 60 |
| Amount (part(s)) | 1.6 | 1.6 | 1.6 | 1.6 | 1.6 |
| Crosslinking agent | | | | | |
| Kind*2 | EX-321 | EX-321 | EX-321 | EX-321 | EX-321 |
| Amount (part(s)) | 0.177 | 0.177 | 0.177 | 0.177 | 0.177 |
| Crosslinking rate of crosslinked polymer (mol %) | 40 | 40 | 40 | 40 | 40 |
| Anionic group (mmol/g)*3 | 1.07 | 1.07 | 1.07 | 1.07 | 1.07 |
| Amount of crosslinking agent used (mmol/g)*4 | 0.79 | 0.79 | 0.79 | 0.79 | 0.79 |
| Average particle size (nm)*5 | 95 | 100 | 100 | 105 | 105 |
| Evaluation results | | | | | |
| Storage stability | Δ | ○ | ○ | ○ | ○ |
| Curling (cm) | 2.1 | 0.9 | 1.0 | 2.1 | 1.1 |
| Optical density | 0.97 | 1.00 | 1.00 | 1.01 | 1.00 |

TABLE 3-1

| | Comparative Examples | | | | |
|---|---|---|---|---|---|
| | 1 | 2 | 3 | 4 | 5 |
| Contents in ink (wt %) | | | | | |
| Pigment | 10 | 10 | 10 | 10 | 5 |
| Water | 65 | 65 | 65 | 50 | 65 |
| Hydrophilic organic solvent*1 | 7 | 7 | 7 | 36.2 | 7 |
| Pigment | | | | | |
| C.I. No. | P15:4 | PY74 | PR122 | PR122 | PR122 |
| Polymer | | | | | |
| Kind | P-1 | P-4 | P-4 | P-2 | P-2 |
| Neutralization degree (%) | 60 | 60 | 60 | 51 | 51 |
| Amount (part(s)) | 1.6 | 1.6 | 1.6 | 1.6 | 0.5 |
| Crosslinking agent | | | | | |
| Kind*2 | — | — | — | — | — |
| Amount (part(s)) | — | — | — | — | — |
| Crosslinking rate of crosslinked polymer (mol %) | — | — | — | — | — |
| Anionic group (mmol/g)*3 | 1.19 | 0.77 | 0.77 | 1.25 | 1.25 |
| Amount of crosslinking agent used (mmol/g)*4 | — | — | — | — | — |
| Average particle size (nm)*5 | 90 | 120 | 110 | 132 | 130 |
| Evaluation results | | | | | |
| Storage stability | X | X | X | XX | ○ |
| Curling (cm) | 5.2 | 5.1 | 5.2 | 3.3 | 4.2 |
| Optical density | 0.97 | 1.04 | 1.04 | 1.00 | 0.93 |

Note
*1 Hydrophilic organic solvent: triethylene glycol monobutyl ether
*2 Crosslinking agent: "DENACOL EX-321" (epoxy equivalent: 140)
*3 Amount of anionic group neutralized with base per 1 g of crosslinked polymer (in Comparative Examples, the amount is per 1 g of polymer)
*4 Amount of crosslinking agent used per 1 g of polymer (in terms of anionic group in polymer)
*5 Average particle size of pigment-containing crosslinked polymer particles or pigment-containing polymer particles

TABLE 3-2

| | Comparative Examples | | | | |
|---|---|---|---|---|---|
| | 6 | 7 | 8 | 9 | 10 |
| Contents in ink (wt %) | | | | | |
| Pigment | 5 | 5 | 10 | 10 | 10 |
| Water | 50 | 65 | 65 | 70 | 50 |
| Hydrophilic organic solvent*1 | 36.2 | 7 | 26.2 | 26.2 | 26.2 |
| Pigment | | | | | |
| C.I. No. | PR122 | PR122 | PV19 | PV19 | PV19 |
| Polymer | | | | | |
| Kind | P-2 | P-2 | P-1 | P-1 | P-1 |
| Neutralization degree (%) | 51 | 20 | 60 | 60 | 60 |
| Amount (part(s)) | 0.5 | 0.5 | 1.6 | 1.6 | 1.6 |
| Crosslinking agent | | | | | |
| Kind*2 | — | — | EX-321 | EX-321 | — |
| Amount (part(s)) | — | — | 0.177 | 0.177 | — |
| Crosslinking rate of crosslinked polymer (mol %) | — | — | 40 | 40 | — |
| Anionic group (mmol/g)*3 | 1.25 | 0.49 | 1.07 | 1.07 | 1.07 |
| Amount of crosslinking agent used (mmol/g)*4 | — | — | 0.79 | 0.79 | — |
| Average particle size (nm)*5 | 131 | 170 | 100 | 100 | 110 |

TABLE 3-2-continued

|  | Comparative Examples | | | | |
|---|---|---|---|---|---|
|  | 6 | 7 | 8 | 9 | 10 |
| Evaluation results | | | | | |
| Storage stability | X | XX | ○ | ○ | XX |
| Curling (cm) | 2.3 | 4.3 | 4.5 | Not measurable*6 | 1.5 |
| Optical density | 0.92 | 0.90 | 1.00 | 1.00 | Not printable*7 |

Note
*6 Not accurately measurable owing to occurrence of excessively large curling
*7 Not printable owing to excessively high viscosity

TABLE 3-3

|  | Comparative Examples | | | | | |
|---|---|---|---|---|---|---|
|  | 11 | 12 | 13 | 14 | 15 | 16 |
| Contents in ink (wt %) | | | | | | |
| Pigment | 10 | 10 | 10 | 10 | 10 | 10 |
| Water | 55 | 60 | 65 | 70 | 65 | 70 |
| Hydrophilic organic solvent*1 | 26.2 | 26.2 | 26.2 | 26.2 | 26.2 | 26.2 |
| Pigment C.I. No. | PV19 | PV19 | PV19 | PV19 | PR19/PR202 | PR19/PR202 |
| Polymer | | | | | | |
| Kind | P-1 | P-1 | P-1 | P-1 | P-1 | P-1 |
| Neutralization degree (%) | 60 | 60 | 60 | 60 | 60 | 60 |
| Amount (part(s)) | 1.6 | 1.6 | 1.6 | 1.6 | 1.6 | 1.6 |
| Crosslinking agent | | | | | | |
| Kind*2 | — | — | — | — | EX-321 | EX-321 |
| Amount (part(s)) | — | — | — | — | 0.177 | 0.177 |
| Crosslinking rate of crosslinked polymer (mol %) | — | — | — | — | 40 | 40 |
| Anionic group (mmol/g)*3 | 1.07 | 1.07 | 1.07 | 1.07 | 1.07 | 1.07 |
| Amount of crosslinking agent used (mmol/g)*4 | — | — | — | — | 0.79 | 0.79 |
| Average particle size (nm)*5 | 108 | 105 | 105 | 100 | 105 | 105 |
| Evaluation results | | | | | | |
| Storage stability | XX | XX | XX | XX | ○ | ○ |
| Curling (cm) | 1.8 | 3.2 | 5.0 | Not measurable*6 | 5.3 | Not measurable*6 |
| Optical density | Not printable*7 | 1.00 | 1.00 | 1.00 | 1.01 | 1.01 |

TABLE 4

|  | Water content (wt %) | Use of crosslinked polymer | Curling (cm) | Ratio in curling there between |
|---|---|---|---|---|
| Example 8 | 50 | Used | 0.9 | 0.60/1 |
| Comparative Example 10 | 50 | Not used | 1.5 | |
| Example 9 | 55 | Used | 1.0 | 0.55/1 |
| Comparative Example 11 | 55 | Not used | 1.8 | |
| Example 1 | 60 | Used | 2.1 | 0.66/1 |
| Comparative Example 12 | 60 | Not used | 3.2 | |
| Example 9 | 65 | Used | 4.5 | 0.90/1 |
| Comparative Example 13 | 65 | Not used | 5.0 | |

The inks obtained in Examples 1 to 11 had a high pigment concentration, an excellent optical density, a low water content, an excellent anti-curling effect as well as an excellent storage stability. Although the pigment used in the water-based ink obtained in Example 7 contained the pigment derivative, the storage stability of the ink was still kept at a practical level.

In Comparative Examples 1 to 3 in which the polymer was not crosslinked, the resulting inks were deteriorated in anti-curling property and storage stability owing to a high water content thereof.

The ink obtained in Comparative Example 4 had a low water content and exhibited an anti-curling effect, but was considerably deteriorated in storage stability.

The ink obtained in Comparative Example 5 exhibited a good storage stability, but had a high water content and was deteriorated in anti-curling property.

The ink obtained in Comparative Example 6 exhibited an anti-curling property, but was deteriorated in storage stability.

In Comparative Example 7, the amount of anionic group neutralized with a base was small, and the resulting ink had a high water content and was deteriorated in anti-curling property and storage stability.

From the comparison between Example 2 and Comparative Example 4, it was confirmed that even though both the inks obtained therein had the same water content (50 wt %), the ink obtained in Example 2 was more excellent in anti-curling effect than that obtained in Comparative Example 4.

From the comparison between Example 8 and Comparative Example 10, between Example 9 and Comparative Example 11, between Example 1 and Comparative Example 12 and between Comparative Example 9 and Comparative Example 13, it was confirmed that when the water content was the same, the inks using the crosslinked water-insoluble polymer exhibited a more excellent anti-curling effect than those using the non-crosslinked water-insoluble polymer, and it was further confirmed that when the water content was adjusted to from 20 to 60% by weight, the inks using the crosslinked water-insoluble polymer were considerably enhanced in anti-curling property owing to a synergistic effect of the water content and use of the crosslinked water-insoluble polymer.

In addition, it was also confirmed that the colorant-containing crosslinked polymer particles produced by replacing "DENACOL EX-321" (trimethylol propane polyglycidyl ether; bifunctional or trifunctional) used in the Examples with "DENACOL EX-411" (pentaerythritol polyglycidyl ether; tetrafunctional) were still more excellent in storage stability in the inks.

Industrial Applicability

The water-based ink for ink-jet printing according to the present invention can be increased in concentration of a colorant incorporated therein and therefore exhibits an excellent optical density, a high anti-curling property when applied to plain paper, and an excellent storage property. Thus, the water-based ink of the present invention can be suitably used as a water-based ink for ink-jet printing.

The invention claimed is:

1. A water-based ink for ink-jet printing comprising particles of a crosslinked water-insoluble polymer which contain a colorant, wherein a content of water in the ink is from 20 to 60% by weight, and the crosslinked polymer contains an anionic group neutralized with a base in an amount of from 0.5 to 5 mmol per 1 g of the crosslinked polymer;
    wherein the particles of a crosslinked water-insoluble polymer which contain a colorant are obtained by crosslinking a polymer contained in colorant-containing polymer particles with a crosslinking agent.

2. The water-based ink for ink-jet printing according to claim 1, wherein a content of the anionic group neutralized with the base in the crosslinked polymer is from 0.5 to 3 mmol/g.

3. The water-based ink for ink-jet printing according to claim 1 or 2, wherein a content of the colorant in the ink is from 4 to 30% by weight.

4. The water-based ink for ink-jet printing according to claim 1, wherein a weight ratio of the colorant to a sum of the crosslinked polymer and the colorant [colorant/(crosslinked polymer+colorant)] is from 55/100 to 90/100.

5. The water-based ink for ink-jet printing according to claim 1, wherein the polymer is a water-insoluble vinyl-based graft polymer.

6. The water-based ink for ink-jet printing according to claim 1, wherein the crosslinking agent contains a functional group capable of reacting with an anionic group contained in the polymer and is used in an amount capable of reacting with from 0.1 to 3 mmol in terms of the anionic group per 1 g of the polymer.

7. The water-based ink for ink-jet printing according to claim 1, wherein the crosslinking agent is used in such an amount that a weight ratio of the crosslinking agent to the polymer [crosslinking agent/polymer] is from 0.3/100 to 50/100.

8. The water-based ink for ink-jet printing according to claim 1, further comprising a hydrophilic organic solvent in an amount of 10% by weight or more.

9. The water-based ink for ink-jet printing according to claim 1, wherein the colorant is a quinacridone solid solution pigment which comprises two or more kinds of quinacridone-based compounds.

10. A process for producing the water-based ink for ink-jet printing as defined in claim 1, comprising the following steps (1) to (4):
    (1) dispersing a mixture of a water-insoluble polymer, an organic solvent, a colorant, a neutralizing agent and water to obtain a dispersion of colorant-containing water-insoluble polymer particles:
    (2) removing the organic solvent from the dispersion obtained in the step (1) to obtain a water dispersion of the colorant-containing water-insoluble polymer particles;
    (3) mixing the water dispersion of the colorant-containing water-insoluble polymer particles which is obtained in the step (2) with a crosslinking agent to crosslink the water-insoluble polymer with the crosslinking agent and thereby obtain a water dispersion of colorant-containing crosslinked water-insoluble polymer particles; and
    (4) mixing the water dispersion obtained in the step (3) with at least a hydrophilic organic solvent to obtain the water-based ink for ink-jet printing.

11. A method of reducing curling of a print, wherein the print is obtained by printing characters or images thereon with the water-based ink as defined in claim 1 using an ink-jet printer.

12. The water-based ink for ink-jet printing according to claim 1, wherein the crosslinked water-insoluble polymer is a crosslinked polymer obtained by crosslinking the water-insoluble polymer with a crosslinking agent.

13. The water-based ink for ink-jet printing according to claim 12, wherein the crosslinking agent is selected from compounds containing from 2 to 6 reactive functional groups in a molecule thereof and the reactive functional groups are one or more groups selected from the group consisting of a hydroxyl group, an epoxy group, an aldehyde group, an amino group, a carboxyl group, an oxazoline group, and an isocyanate group.

14. The water-based ink for ink-jet printing according to claim 12, wherein a solubility of the crosslinking agent in 100 g of water at 25° C. is 50 g or less.

15. The water-based ink for ink-jet printing according to claim 12, wherein the crosslinking agent is one or more groups selected from the group consisting of compounds (a) to (g):
   (a) compounds containing two or more hydroxyl groups in a molecule thereof;
   (b) compounds containing two or more epoxy groups in a molecule thereof;
   (c) compounds containing two or more aldehyde groups in a molecule thereof;
   (d) compounds containing two or more amino groups in a molecule thereof;
   (e) compounds containing two or more carboxyl groups in a molecule thereof;
   (f) compounds containing two or more oxazoline groups in a molecule thereof; and
   (g) compounds containing two or more isocyanate groups in a molecule thereof.

16. The water-based ink for ink-jet printing according to claim 8, wherein the hydrophilic organic solvent is monoalkyl ethers of one or more alkylene glycols selected from the group consisting of monoalkylene glycols, dialkylene glycols, and trialkylene glycols.

17. The water-based ink for ink-jet printing according to claim 8, wherein the content of the hydrophilic organic solvent in the water-based ink is from 10 to 35% by weight.

18. The water-based ink for ink-jet printing according to claim 8, wherein the content of the hydrophilic organic solvent in the water-based ink is from 15 to 35% by weight.

19. The water-based ink for ink-jet printing according to claim 1, wherein the crosslinking agent is selected from the group consisting of polyglycidyl ethers, polyaldehydes, polyamines, polycarboxylic acids, compounds containing an aliphatic or aromatic group to which two or more oxazoline groups are bonded, organic polyisocyanates, and isocyanate-terminated prepolymers.

20. The water-based ink for ink-jet printing according to claim 15, wherein the compound (a) is polyhydric alcohol selected from the group consisting of ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanol amine, tridiethanol amine, polypropylene glycol, polyvinyl alcohol, pentaerythritol, sorbitol, sorbitan, glucose, mannitol, mannitan, sucrose and glucose.

21. The water-based ink for ink-jet printing according to claim 1, wherein the crosslinking agent is one or more groups selected from the group consisting of compounds (a) to (f):
   (a) compounds containing two or more hydroxyl groups in a molecule thereof;
   (b) compounds containing two or more epoxy groups in a molecule thereof;
   (c) compounds containing two or more aldehyde groups in a molecule thereof;
   (d) compounds containing two or more amino groups in a molecule thereof;
   (e) compounds containing two or more carboxyl groups in a molecule thereof; and
   (f) compounds containing two or more oxazoline groups in a molecule thereof.

* * * * *